(12) United States Patent
Narita et al.

(10) Patent No.: US 9,994,192 B2
(45) Date of Patent: Jun. 12, 2018

(54) VEHICLE POP-UP HOOD DEVICE

(71) Applicant: TOYOTA JIDOSHA KABUSHIKI KAISHA, Toyota-shi, Aichi-ken (JP)

(72) Inventors: Sotaro Narita, Toyota (JP); Yoshinori Uozumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/235,584

(22) Filed: Aug. 12, 2016

(65) Prior Publication Data

US 2017/0057458 A1 Mar. 2, 2017

(30) Foreign Application Priority Data

Sep. 2, 2015 (JP) .................................. 2015-172720

(51) Int. Cl.
*B60R 21/38* (2011.01)
*B62D 25/12* (2006.01)

(52) U.S. Cl.
CPC .............. *B60R 21/38* (2013.01); *B62D 25/12* (2013.01)

(58) Field of Classification Search
CPC ......... B60R 21/38; B60R 21/34; B62D 25/12; B62D 25/10
USPC ........ 180/274, 69.21, 69.2, 271; 296/187.04, 296/193.11
See application file for complete search history.

(56) References Cited

U.S. PATENT DOCUMENTS

| | | | |
|---|---|---|---|
| 6,345,679 B1* | 2/2002 | Sasaki ..................... | B60R 21/38 180/271 |
| 6,953,220 B2* | 10/2005 | Takehara ............. | B62D 25/105 180/69.2 |
| 7,506,716 B1* | 3/2009 | Salmon .................. | B60R 21/38 180/274 |
| 9,481,340 B2* | 11/2016 | Kim ........................ | B60R 21/34 |

FOREIGN PATENT DOCUMENTS

| | | |
|---|---|---|
| JP | 4887512 B2 | 2/2012 |
| JP | 2014-108651 A | 6/2014 |
| WO | 2016/021326 A1 | 2/2016 |

* cited by examiner

*Primary Examiner* — Keith Frisby
(74) *Attorney, Agent, or Firm* — Oliff PLC

(57) ABSTRACT

A vehicle pop-up hood device includes: a hinge base; a first arm that has a rear end portion coupled to the hinge base, and that has a front portion disposed offset toward the vehicle width direction inner side with respect to the rear end portion; a second arm that is coupled to the front portion of the first arm so as to be capable of swinging, and that moves the hood toward a vehicle upper side; an actuator that spans between the first arm and the second arm, and that lifts the hood from a closed position to a lifted position; and a link mechanism that includes a first link and a second link. A coupling location of the hinge base to the first link is disposed further to the vehicle width direction inner side than a coupling location of the hinge base to the first arm.

6 Claims, 8 Drawing Sheets

VEHICLE POP-UP HOOD DEVICE

CROSS-REFERENCE TO RELATED APPLICATION

This application claims priority under 35 USC 119 from Japanese Patent Application No. 2015-172720 filed Sep. 2, 2015, the disclosure of which is incorporated by reference herein.

BACKGROUND

Technical Field

Technology disclosed herein relates to a vehicle pop-up hood device.

Related Art

A vehicle pop-up hood device described in Japanese Patent Application Laid-Open (JP-A) No. 2014-108651 is configured including a hinge base that is fixed to a vehicle body, and a hinge arm that is coupled to the hinge base so as to be capable of swinging, and that is fixed to a hood. The vehicle pop-up hood device includes a link mechanism that couples the hinge base and the hinge arm together, and configuration is made such that the link mechanism suppresses the hood from shifting a long way toward the vehicle rear side in a vehicle frontal collision. Note that Japanese Patent No. 4887512 also describes a vehicle pop-up hood device.

In the vehicle pop-up hood device described above, a front end side portion of the hinge arm is disposed offset toward a vehicle width direction inner side, and the link mechanism is provided between the offset portion and the hinge base. If this offset amount in the vehicle pop-up hood device becomes large due to design constraints, for example, there is a possibility that wrenching of the respective coupling locations of the link mechanism could occur during actuation of the link mechanism, resulting in major operation loss in the link mechanism.

An exemplary embodiment of the present invention provides a vehicle pop-up hood device capable of suppressing operation loss of a link mechanism.

SUMMARY

A vehicle pop-up hood device according to a first aspect of the present invention includes: a hinge base that is fixed to a vehicle body; a first arm that is disposed at a vehicle width direction inner side of the hinge base, that has a rear end portion coupled to the hinge base so as to be capable of swinging, and that has a front portion disposed offset toward a vehicle width direction inner side with respect to the rear end portion; a second arm that is disposed at a vehicle width direction inner side of the first arm, that is fixed to a vehicle width direction outer side end portion of a rear section of a hood, that is coupled to the front portion of the first arm so as to be capable of swinging, and that moves the hood toward a vehicle upper side by swinging with respect to the first arm; an actuator that spans between the first arm and the second arm, actuation of the actuator causing the second arm to be swung with respect to the first arm, whereby the hood is lifted from a closed position to a lifted position; and a link mechanism that includes a first link having one end portion coupled to the hinge base so as to be capable of swinging, and a second link having one end portion coupled to another end portion of the first link so as to be capable of swinging and having another end portion coupled to the second arm so as to be capable of swinging, the link mechanism adopting a stowed state in a non-actuated state of the actuator, and adopting an actuated state limiting movement of the second aim toward the vehicle upper side with respect to the hinge base at a time of completion of actuation of the actuator, wherein a coupling location of the hinge base to the first link is disposed further toward the vehicle width direction inner side than a coupling location of the hinge base to the first arm.

In the vehicle pop-up hood device configured as described above, the first arm is disposed at the vehicle width direction inner side of the hinge base that is fixed to the vehicle body. The rear end portion of the first arm is coupled to the hinge base so as to be capable of swinging. The front portion of the first arm is disposed offset toward the vehicle width direction inner side with respect to the rear end portion of the first arm. The second arm is disposed at the vehicle width direction inner side of the first arm, and the second arm is coupled to the front portion of the first arm so as to be capable of swinging. Accordingly, the second arm is also disposed offset to the vehicle width direction inner side with respect to the hinge base.

The second arm is fixed to the vehicle width direction outer side end portion of the rear section of the hood, and is coupled to the hinge base through the link mechanism. The one end portion of the first link is coupled to the hinge base so as to be capable of swinging, and the other end portion of the first link is coupled to the one end portion of the second link so as to be capable of swinging. The other end portion of the second link is coupled to the second arm so as to be capable of swinging. When the actuator that spans between the first arm and the second arm actuates, the second arm swings with respect to the first aim, the hood is lifted from the closed position to the lifted position, and from the stowed state, the link mechanism actuates so as to adopt the actuated state. The link mechanism actuates at this time, such that displacement of the second arm toward the vehicle upper side at the lifted position is restricted by the link mechanism.

The coupling location of the hinge base to the first link is disposed further to a vehicle width direction inner side than the coupling location of the hinge base to the first arm. Accordingly, by setting the vehicle width direction position of the coupling location of the hinge base to the first link appropriately, the vehicle width direction offset amount between the one end portion of the first link and the other end portion of the second link can be suppressed from becoming large, even if the second arm has a large offset amount toward the vehicle width direction inner side with respect to the hinge base. This thereby enables operation loss of the link mechanism to be suppressed.

A vehicle pop-up hood device of a second aspect of the present invention is the vehicle pop-up hood device of the first aspect of the present invention, wherein the first link extends in a straight line shape along a vehicle front-rear direction in plan view; and a length direction intermediate portion of the second link is formed with an inclined portion that is inclined toward the vehicle width direction inner side on progression from one end side of the second link toward another end side of the second link.

In the vehicle pop-up hood device configured as described above, the first link extends in a straight line shape along the vehicle front-rear direction in plan view, thereby enabling the vehicle width direction positions of the one end portion and the other end portion of the first link to be made to match to each other. This thereby enables good swinging of the first link during actuation of the link mechanism.

A vehicle pop-up hood device of a third aspect of the present invention is the vehicle pop-up hood device of the first aspect of the present invention, wherein a distance from the one end portion of the first link to the other end portion of the first link in the vehicle width direction matches a distance from the one end portion of the second link to the other end portion of the second link in the vehicle width direction.

The vehicle pop-up hood device configured as described above enables well-balanced placement of the first link and the second link of the link mechanism.

A vehicle pop-up hood device according to a fourth aspect of the present invention is the vehicle pop-up hood device according to of any one of the first aspect to the third aspect, wherein the hinge base includes a side wall including a first side wall portion and a second side wall portion, wherein the first arm is coupled to the first side wall portion, the second side wall portion is integrally formed with the first side wall portion and is disposed at a vehicle width direction inner side of the first side wall portion, and the first link is coupled to the second side wall portion; and a fixing wall that extends out from a lower end portion of the first side wall portion and the second side wall portion toward a vehicle width direction outer side, and that is fixed to the vehicle body.

In the vehicle pop-up hood device configured as described above, the hinge base includes the fixing wall that is fixed to the vehicle body, and the side wall to which the first arm and the first link are coupled. The side wall includes the first side wall portion to which the first arm is coupled, and the second side wall portion to which the first link is coupled. The second side wall portion is integrally formed with the first side wall portion and is disposed at the vehicle width direction inner side of the first side wall portion. The fixing wall extends out from the lower end portion of the first side wall portion and the second side wall portion toward the vehicle width direction outer side. This thereby enables the coupling location of the hinge base to the link mechanism to be disposed further to the vehicle width direction inner side than the coupling location of the hinge base to the first arm, while configuring the side wall (the first side wall portion and the second side wall portion) with high strength.

A vehicle pop-up hood device according to a fifth aspect of the present invention is the vehicle pop-up hood device of the fourth aspect of the present invention, wherein: the fixing wall is fixed to the vehicle body by a fixing member; and in plan view, the fixing member is disposed overlapping with a coupling location of the hinge base to the first link in the vehicle width direction.

In the vehicle pop-up hood device configured as described above, the fixing wall is fixed by the fixing member at a position at a vehicle width direction outer side of the coupling location of the hinge base to the first link. This thereby enables support performance of the first link by the hinge base to be improved.

A vehicle pop-up hood device of a sixth aspect of the present invention is the vehicle pop-up hood device of the fifth aspect of the present invention, wherein the fixing wall is formed with a bead that extends along the vehicle width direction at a position at a vehicle width direction inner side of the fixing member.

In the vehicle pop-up hood device configured as described above, the bead is formed with the fixing wall between the fixing member and the second side wall portion. This thereby enables the support performance of the first link by the hinge base to be further improved.

The vehicle pop-up hood device according to the first aspect of the present invention enables operation loss of the link mechanism to be suppressed.

The vehicle pop-up hood device according to the second aspect of the present invention enables good swinging of the first link during actuation of the link mechanism.

The vehicle pop-up hood device according to the third aspect of the present invention enables well-balanced placement of the first link and the second link.

The vehicle pop-up hood device according to the fourth aspect of the present invention enables the side wall to be configured with high strength.

The vehicle pop-up hood devices according to the fifth aspect and the sixth aspect of the present invention enable support performance of the first link by the hinge base to be improved.

BRIEF DESCRIPTION OF THE DRAWINGS

Exemplary embodiments of the present invention will be described in detail based on the following figures, wherein.

DETAILED DESCRIPTION

Explanation follows regarding a vehicle pop-up hood device 20 (referred to below as the "PUH device 20")

according to an exemplary embodiment, with reference to the drawings. Note that in the respective drawings, the arrow FR, the arrow UP, and the arrow RH respectively indicate a vehicle front side, vehicle upper side, and vehicle right side of a vehicle applied with the PUH devices 20, as appropriate. Unless specifically indicated otherwise, in the following explanation, reference simply to front-rear, up-down, and left-right directions indicates the front and rear in a vehicle front-rear direction, up and down in a vehicle up-down direction, and left and right in a vehicle left-right direction (vehicle width direction).

Figure 2:
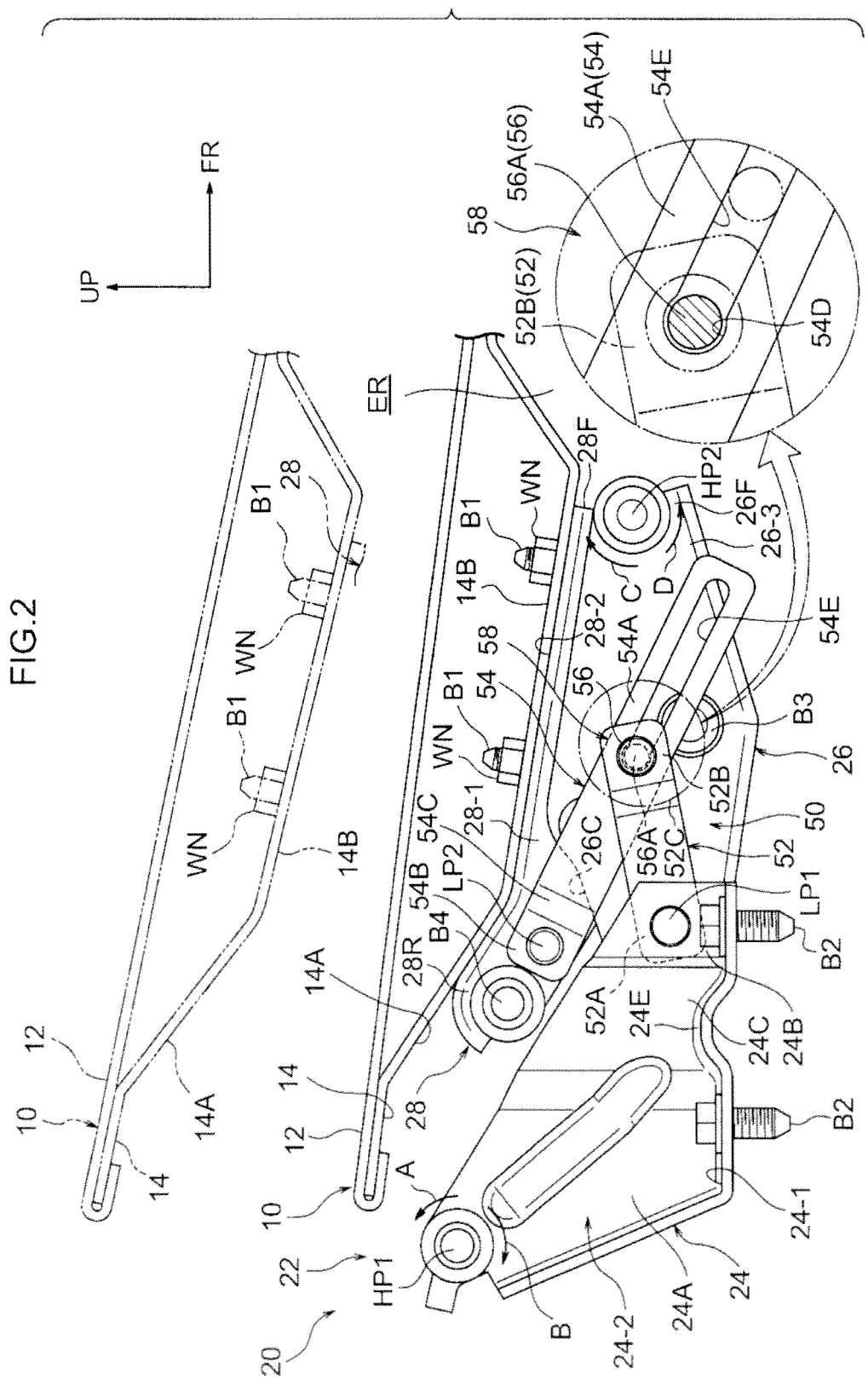
FIG. 2 is a side view illustrating the vehicle pop-up hood device illustrated in FIG. 1.

The PUH devices 20 are respectively installed at both vehicle width direction end portions of a rear end section of a hood 10 that opens and closes an engine room (power unit chamber) ER at a front section of the vehicle, as illustrated in FIG. 2 (in FIG. 2, only the PUH device 20 installed on the right side is illustrated). The PUH devices 20 respectively installed on the vehicle right side and the vehicle left side are configured with left-right symmetry to each other. Accordingly, explanation is given below regarding the PUH device 20 installed on the right side, and explanation regarding the PUH device 20 installed on the left side is omitted.

The PUH device 20 is configured including a hood hinge 22 that supports the hood 10 so as to be capable of opening and closing, and an actuator 30 (see FIG. 1 and FIG. 3) that actuates in the event of a collision between the vehicle and a pedestrian. The PUH device 20 is further configured including a link mechanism 50 for suppressing movement of the hood 10 toward an upper side following actuation of the actuator 30. Explanation initially follows regarding the hood 10, followed by explanation regarding the respective configurations mentioned above.

Hood 10 Configuration

The hood 10 is configured including a hood outer panel 12 disposed at the outer side of the vehicle, and a hood inner panel 14 disposed on the engine room ER side. Terminal portions of the hood outer panel 12 and the hood inner panel 14 are joined together by hemming. In a state in which the engine room ER is closed off by the hood 10 (the position illustrated by solid lines in FIG. 2; this position is referred to below as the "closed position"), a front end section of the hood 10 is fixed to the vehicle body by a hood lock, not illustrated in the drawings.

A protruding portion 14A is formed at a rear end section of the hood inner panel 14. The protruding portion 14A protrudes out toward the lower side of the hood inner panel 14, and extends along the vehicle width direction. A bottom wall 14B of the protruding portion 14A is disposed substantially parallel to the hood outer panel 12 in side view cross-section. Weld nuts WN for attaching the hood hinges 22, described later, are provided to an upper face of the bottom wall 14B at both vehicle width direction end portions of the hood 10.

Hood Hinge 22

As illustrated in FIG. 1 to FIG. 5, the hood hinge 22 is configured including a hinge base 24 that is fixed to the vehicle body, a first arm 26 coupled to the hinge base 24 so as to be capable of swinging, and a second arm 28 that is coupled to the first arm 26 so as to be capable of swinging, and that is fixed to the protruding portion 14A of the hood 10 by hinge bolts B1 (see FIG. 2).

The hinge base 24 is manufactured from sheet steel, and is bent substantially into an inverted L-shape as viewed from the front. A lower end portion of the hinge base 24 configures a fixing wall 24-1. The plate thickness direction of the fixing wall 24-1 runs substantially along the up-down direction, and the fixing wall 24-1 extends in the front-rear direction. A front end portion and a rear end portion of the fixing wall 24-1 are fixed to the vehicle body by fixing bolts B2, these being an example of a "fixing member" according to technology disclosed herein.

The hinge base 24 further includes a side wall 24-2. The plate thickness direction of the side wall 24-2 runs along the vehicle width direction, and the side wall 24-2 extends out from a vehicle width direction inner side end portion of the fixing wall 24-1 toward the upper side. The side wall 24-2 is bent substantially into a crank shape such that a front side portion juts out toward a vehicle width direction inner side in plan view. Specifically, the side wall 24-2 includes a first side wall portion 24A configuring a rear end side portion of the side wall 24-2, a second side wall portion 24B configuring a front end side portion of the side wall 24-2, and an inclined wall portion 24C coupling the first side wall portion 24A and the second side wall portion 24B together. In plan view, the inclined wall portion 24C is inclined toward the vehicle width direction inner side on progression from a front end of the first side wall portion 24A toward the front side. The second side wall portion 24B is accordingly disposed at a vehicle width direction inner side of the first side wall portion 24A. A front-rear direction intermediate portion (specifically, a portion between a front end portion and a rear end portion) and front end portion of the fixing wall 24-1 also jut out toward the vehicle width direction inner side, and where it juts out, the fixing wall 24-1 is formed substantially in a trapezoidal shape in plan view.

A first bead 24D, this being an example of a "bead" according to technology disclosed herein, is formed at a position on a vehicle width direction inner side of the fixing bolt B2 at the front end portion of the fixing wall 24-1. The first bead 24D protrudes out toward the upper side, and extends along the vehicle width direction. A vehicle width direction inner side end portion of the first bead 24D reaches the vicinity of a lower end portion of the second side wall portion 24B. Moreover, a second bead 24E is formed protruding out toward the upper side at a front-rear direction intermediate portion of the fixing wall 24-1. The second bead 24E extends spanning the entire fixing wall 24-1 in the width direction.

Figure 1:
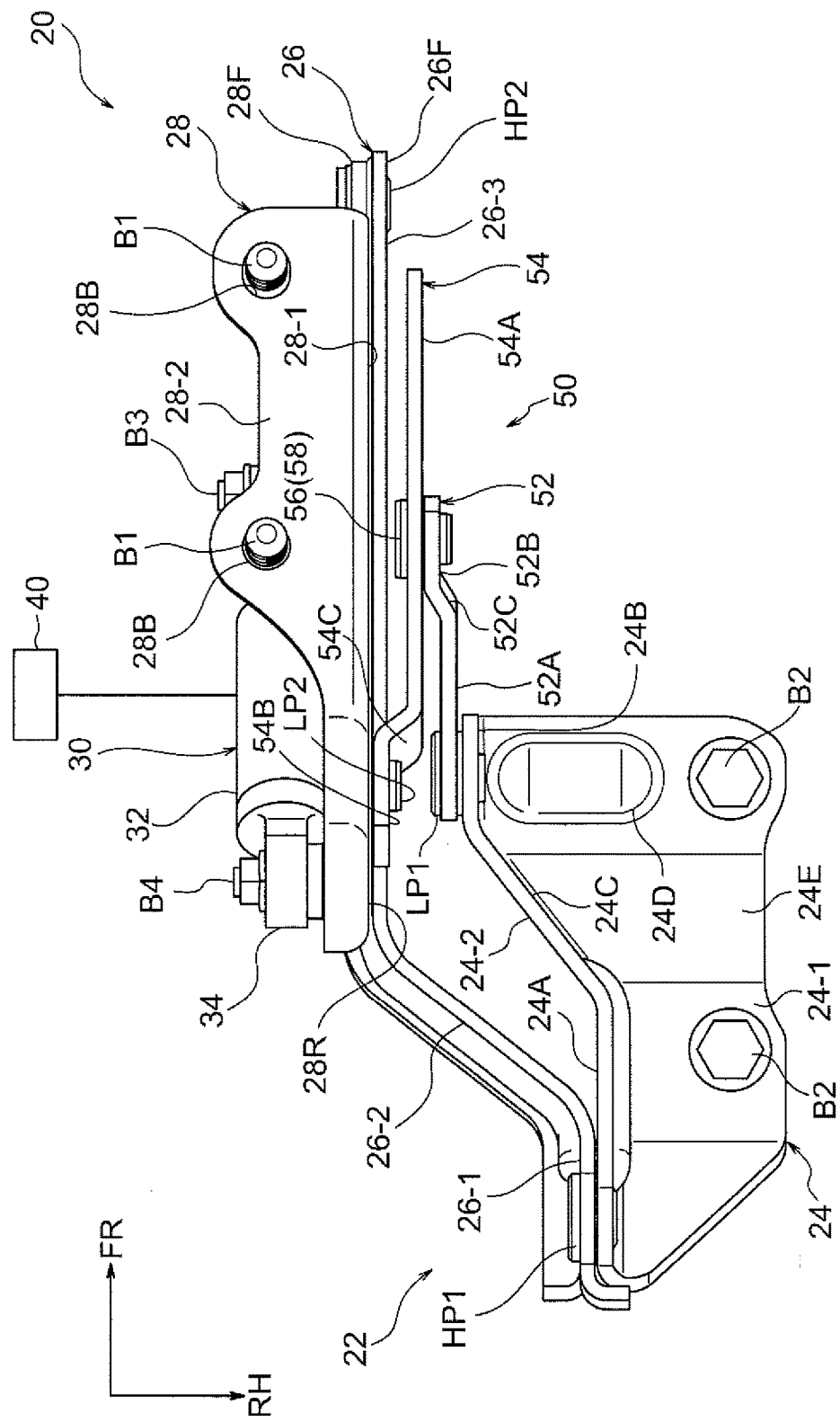
FIG. 1 is a plan view illustrating a vehicle pop-up hood device of an exemplary embodiment.

The first arm 26 is manufactured from sheet steel, similarly to the hinge base 24, is disposed at a vehicle width direction inner side of the hinge base 24, and is bent substantially into a crank shape in plan view (see FIG. 1). Specifically, the first arm 26 is configured including a rear end portion 26-1 disposed with its plate thickness direction in the vehicle width direction, an intermediate portion 26-2 inclined toward the vehicle width direction inner side on progression from the front end of the rear end portion 26-1 toward the front side, and a front portion 26-3 extending out from a front end of the intermediate portion 26-2 toward the front side.

A first hinge pin HP1 (an element understood as falling under the broad definition of a "first pin") with an axial direction in the vehicle width direction couples the rear end portion 26-1 of the first arm 26 to an upper end portion of the first side wall portion 24A of the hinge base 24, so as to be capable of swinging. The first arm 26 is thereby configured capable of swinging about the first hinge pin HP1 so as to swing in the up-down direction (the arrow A direction and the arrow B direction in FIG. 2) relative to the hinge base 24.

As described above, in plan view, the intermediate portion 26-2 of the first arm 26 is inclined toward the vehicle width direction inner side on progression toward the front side. The front portion 26-3 of the first arm 26 is accordingly disposed offset to a vehicle width direction inner side of the rear end portion 26-1 of the first arm 26. The offset amount is set by vehicle type, according to design considerations and the like. The front portion 26-3 of the first arm 26 is disposed at a vehicle width direction inner side of the second side wall portion 24B of the hinge base 24, and the distance between the front portion 26-3 and the second side wall portion 24B in the vehicle width direction is set to the minimum distance at which the link mechanism 50, described later, can be disposed therebetween.

Figure 5:
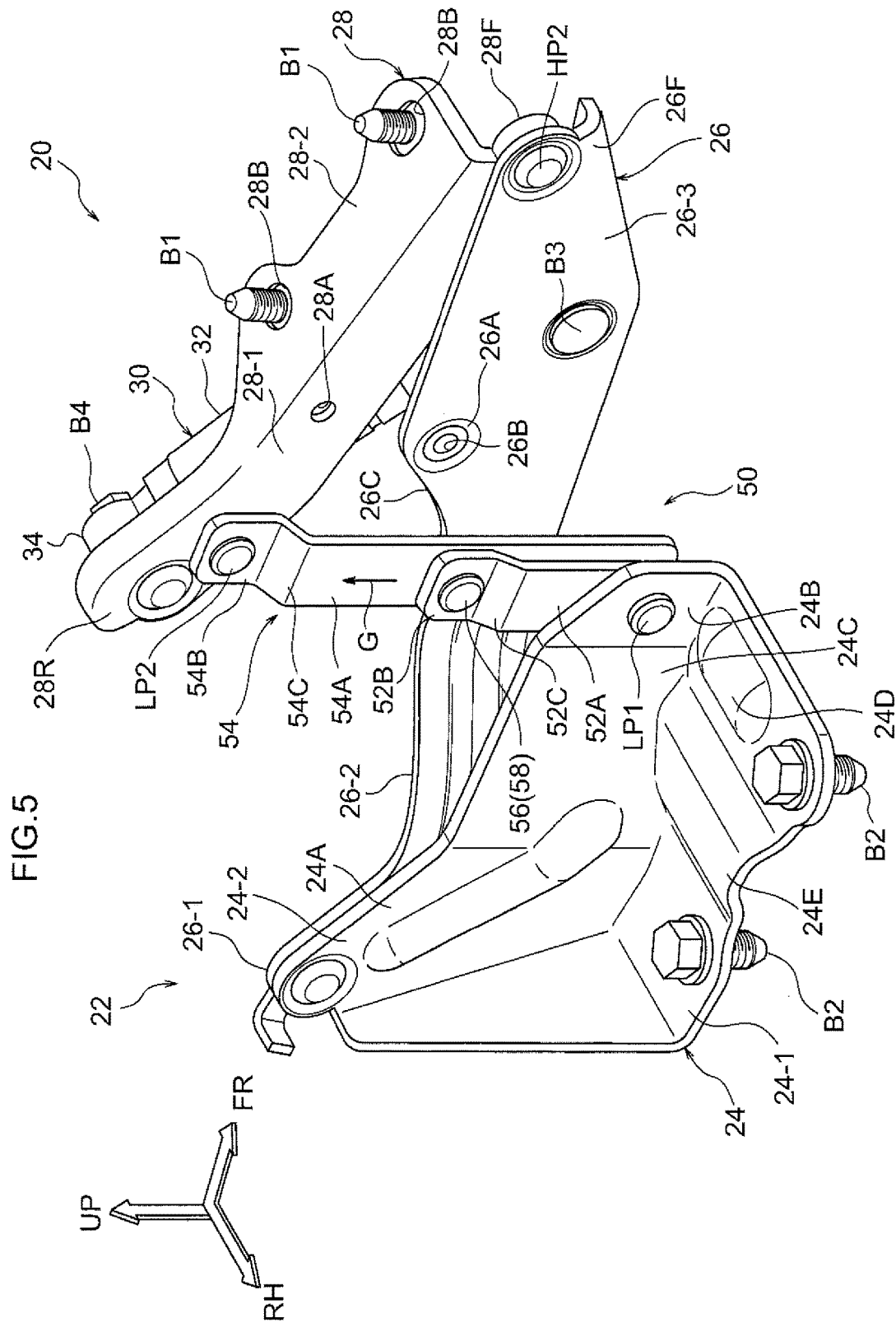
FIG. 5 is a perspective view illustrating a state of the vehicle pop-up hood device following actuation of the actuator illustrated in FIG. 4, as viewed from the oblique front right of the vehicle.

Moreover, as illustrated in FIG. 5, a first coupling bolt B3 for attaching the actuator 30, described later, is fixed to a lower portion of a length direction intermediate portion of the front portion 26-3 of the first arm 26. The first coupling bolt B3 projects out toward the vehicle width direction inner side with an axial direction in the vehicle width direction. An upper portion of the front portion 26-3 is formed with a first protruding portion 26A protruding out toward a vehicle width direction inner side at a position further to the rear side than the first coupling bolt B3. A shear pin insertion hole 26B through which a shear pin, not illustrated in the drawings, is inserted, is formed penetrating a substantially central portion of the first protruding portion 26A.

An upper end portion of the front portion 26-3 of the first arm 26 is formed with a cutaway portion 26C at a position to the rear side of the first protruding portion 26A in order to avoid interference between another end portion 54B of a second link 54, described later, and the first arm 26. The cutaway portion 26C is inclined toward the upper side on progression toward the front side as viewed from the side, and is curved smoothly so as to bow inward toward the oblique front lower side.

The second arm 28 illustrated in FIG. 1 to FIG. 5 is manufactured from sheet steel. The second aim. 28 is disposed at a vehicle width direction inner side of the first arm 26, extends along the front-rear direction in plan view, and is bent substantially into an inverted L-shape as viewed from the front. Specifically, the second arm 28 includes a side wall 28-1 disposed parallel to the front portion 26-3 of the first arm 26. A second hinge pin HP2 (an element understood as falling under the broad definition of a "second pin") with an axial direction in the vehicle width direction couples a front end portion 28F of the side wall 28-1 (second arm 28) to a front end portion 26F of the first arm 26 (front portion 26-3), so as to be capable of swinging. The second arm 28 is thereby configured capable of swinging about the second hinge pin HP2 so as to swing in the up-down direction (the arrow C direction and the arrow D direction in FIG. 2) relative to the first arm 26.

As illustrated in FIG. 5, a shear pin insertion hole 28A is formed penetrating the side wall 28-1 of the second arm 28 at a position corresponding to the shear pin insertion hole 26B of the first arm 26 described above. The shear pin, not illustrated in the drawings, is fitted inside the shear pin insertion hole 26B of the first arm 26 and the shear pin insertion hole 28A of the second arm 28, thereby joining the second arm 28 and the first arm 26 together. In this manner, the second arm 28 is restricted from swinging relative to the first arm 26 in a non-actuated state of the actuator 30, described later.

The second arm 28 includes an upper wall 28-2. The upper wall 28-2 extends out from an upper end portion of the side wall 28-1 toward the vehicle width direction inner side, and is disposed adjacent to a lower face of the protruding portion 14A of the hood 10. A pair of attachment holes 28B are formed penetrating the upper wall 28-2 in a row in the front-rear direction. The hinge bolts B1 are inserted into the attachment holes 28B from the lower side and screwed into the weld nuts WN (see FIG. 2), thereby fastening (fixing) the upper wall 28-2 to the protruding portion 14A of the hood 10. In this manner, the hood 10 and the hinge base 24 are coupled together through the first arm 26 and the second arm 28.

Moreover, a second coupling bolt B4 for attaching the actuator 30, described later, is fixed to a rear end portion 28R of the side wall 28-1 of the second arm 28, at a position to the rear side of the first coupling bolt B3. The second coupling bolt B4 is disposed with an axial direction in the vehicle width direction, and projects out from the second arm 28 toward the vehicle width direction inner side.

The hood hinge 22 configured as described above functions as a hinge component that swingably supports the hood 10. Namely, during normal operation of the hood 10, the hood 10 is opened and closed by swinging the first arm 26 with respect to the hinge base 24 about the first hinge pin HP1, in a state in which the first arm 26 and the second arm 28 are restricted from swinging relative to each other.

Actuator 30

Figure 3:
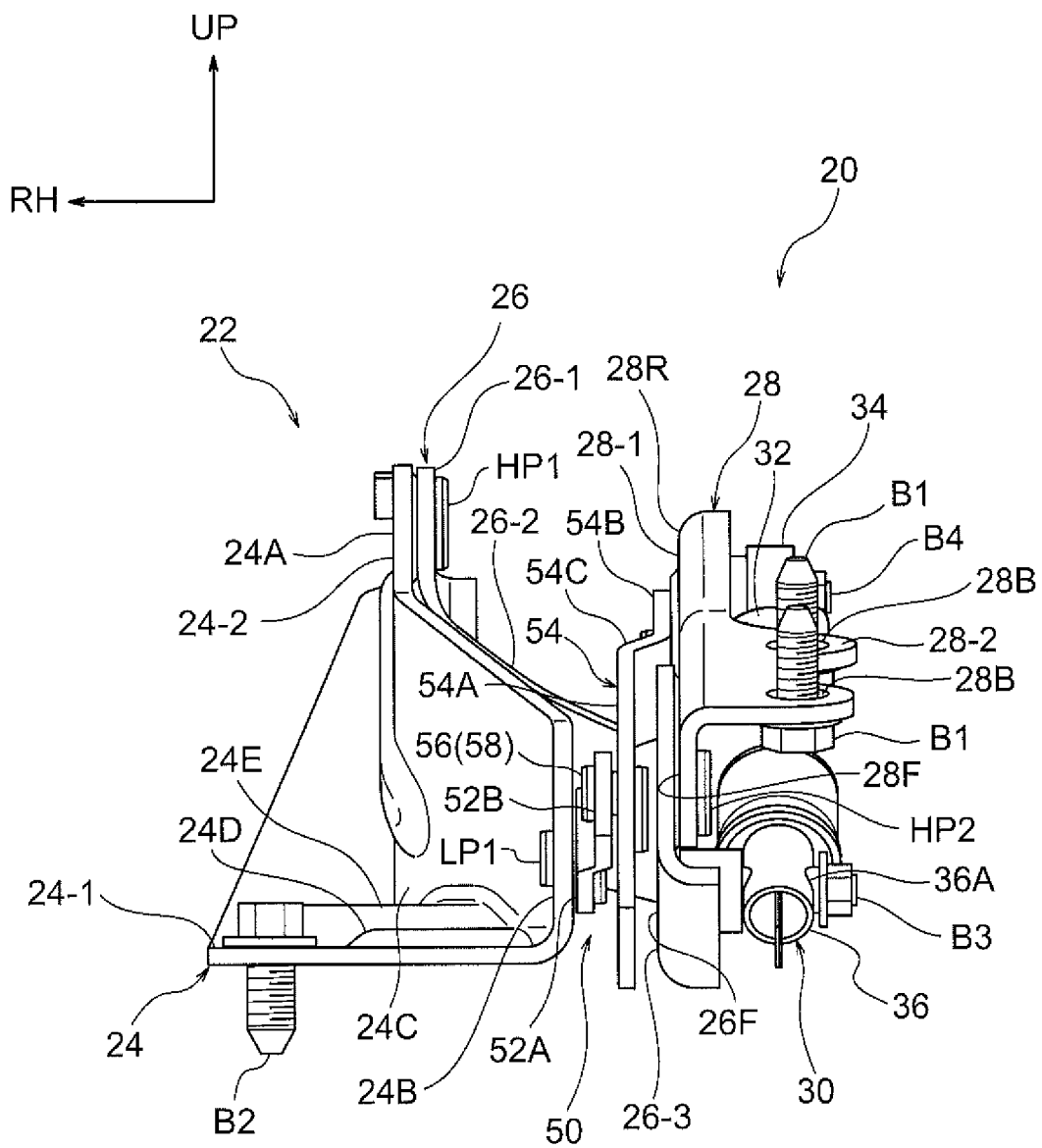
FIG. 3 is a front view illustrating the vehicle pop-up hood device illustrated in FIG. 1.
Figure 4:
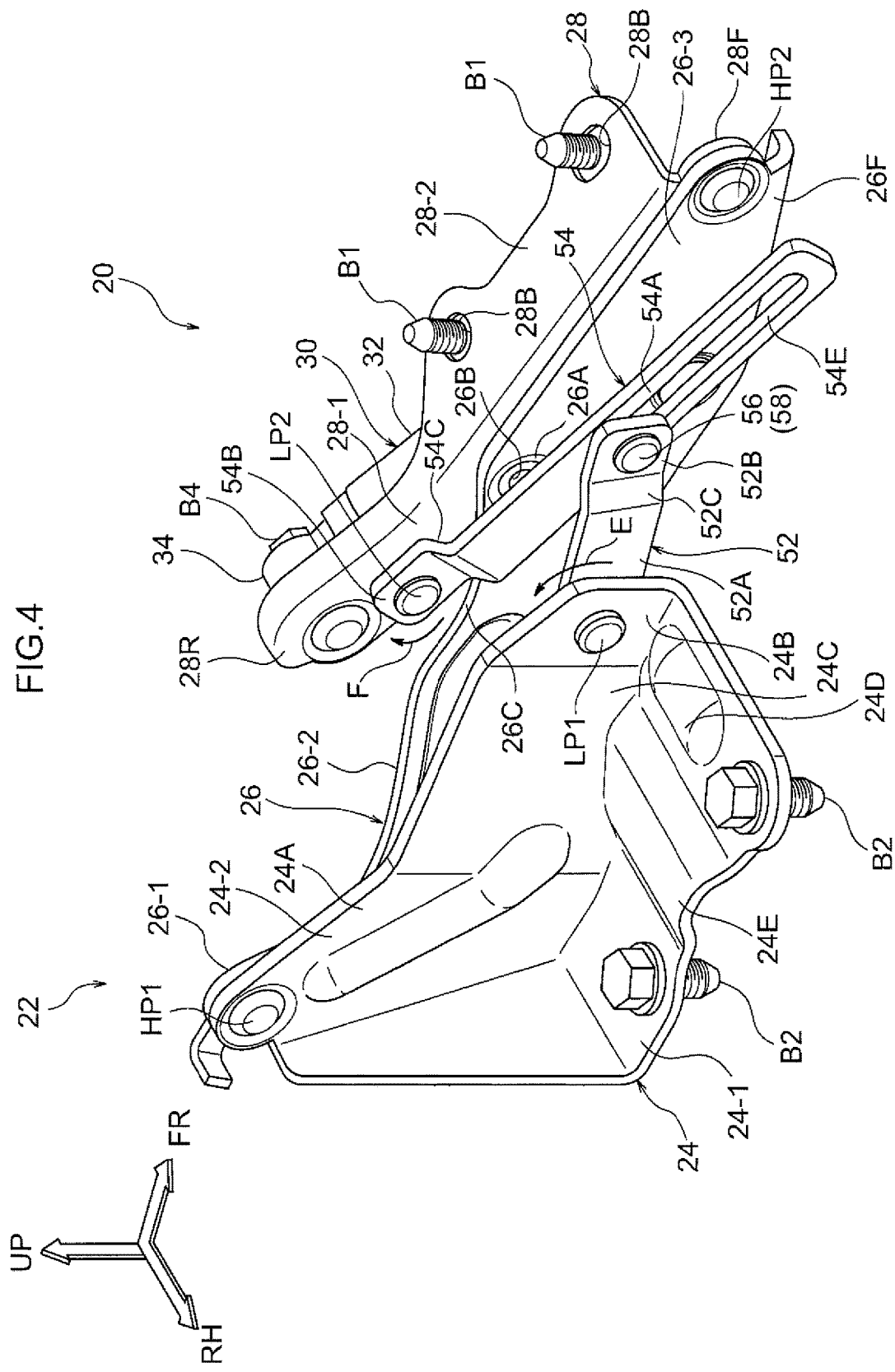
FIG. 4 is a perspective view illustrating a state of the vehicle pop-up hood device prior to actuation of an actuator illustrated in FIG. 1, as viewed from the oblique front right of the vehicle.

As illustrated in FIG. 1 and FIG. 3, the actuator 30 is disposed at a vehicle width direction inner side of the second arm 28, and spans between the first coupling bolt B3 of the first arm 26 and the second coupling bolt B4 of the second arm 28. As viewed from the side, the actuator 30 is inclined toward the upper side on progression toward the rear side. The actuator 30 is configured including a cylinder 32 and a rod 36.

The cylinder 32 is formed substantially in a bottomed circular tube shape that is open at a lower side (a lower end side of the actuator 30). An upper end portion of the cylinder 32 is integrally provided with an attachment portion 34. An attachment hole, not illustrated in the drawings, is formed penetrating the attachment portion 34. The second coupling bolt B4 described above is inserted into the attachment hole, and the attachment portion 34 is swingably supported by the second coupling bolt B4. The upper end portion of the cylinder 32 is thereby attached to the second arm 28 so as to be capable of swinging with respect to the second arm 28.

As illustrated in FIG. 3, the rod 36 is formed in a substantially circular tube shape, and is disposed coaxially to the cylinder 32. With the exception of a lower end portion, the rod 36 is housed inside the cylinder 32 so as to be capable of moving relative to the cylinder 32. An attachment hole 36A is formed penetrating a lower end portion of the rod 36 in the vehicle width direction. The first coupling bolt B3 described above is inserted into the attachment hole 36A, thereby swingably supporting the lower end portion of the rod 36 on the first coupling bolt B3. Namely, the lower end portion of the rod 36 is attached to the first arm 26 so as to be capable of swinging relative thereto.

A micro gas generator (referred to below as "MGG") is fitted into a length direction intermediate portion of the rod 36. The MGG is electrically connected to an ECU 40 (see FIG. 1), and the MGG is configured so as to actuate under the control of the ECU 40. When the MGG is actuated, gas generated by the MGG is supplied into the rod 36 and the cylinder 32, and the cylinder 32 rises along the axial direction of the actuator 30. Configuration is made such that the second arm 28 thereby swings from the position illustrated in FIG. 2 toward the upper side relative to the first arm 26 (in the arrow C direction in FIG. 2), lifting the hood 10 to a lifted position (the position illustrated by double-dotted intermittent lines in FIG. 2). Note that when this is performed, the first arm 26 swings toward the upper side relative to the hinge base 24 (in the arrow A direction in FIG. 2).

A lower end portion of the cylinder 32 is formed with plural gas escape holes, not illustrated in the drawings. Configuration is made such that when the actuator 30 actuates and the cylinder 32 rises to the lifted position, the interior and the exterior of the cylinder 32 are placed in communication with each other through the gas escape holes, and the gas supplied into the cylinder 32 (rod 36) is released (escapes) through the gas escape holes. As a result, configuration is made such that lifting of the hood 10 by the actuator 30 comes to a stop at the lifted position of the hood 10.

The actuator 30 also includes a retention mechanism, not illustrated in the drawings. The cylinder 32 that has risen to the lifted position is restricted from retracting with respect to the rod 36 by the retention mechanism. As described in detail later, in the actuator 30, configuration is made such that the cylinder 32 is capable of rising by a specific distance with respect to the rod 36 when a specific load toward the upper side is input to the attachment portion 34 of the cylinder 32 due to the behavior of the hood 10 when lifted to the lifted position.

Link Mechanism 50

As illustrated in FIG. 1 to FIG. 5, the link mechanism 50 is configured including a first link 52 and a second link 54, and includes a displacement mechanism 58 at a coupling location between the first link 52 and the second link 54. When the hood 10 is in the closed position, the link mechanism 50 is bent substantially into a V-shape opening toward the rear side as viewed from the side (the state illustrated in FIG. 2; this state is referred to below as the "stowed state").

The first link 52 is manufactured from sheet steel, and is formed substantially in an elongated plate shape. The first link 52 configures a portion on one end side (a portion on a lower side) of the link mechanism 50, and is disposed adjacent on the vehicle width direction inner side with respect to the second side wall portion 24B of the hinge base 24, with a plate thickness direction in the vehicle width direction. As viewed from the side, in the stowed state, the first link 52 is disposed in a state inclined slightly toward the upper side on progression toward the front side. A first link pin LP1 with an axial direction in the vehicle width direction couples one end portion 52A of the first link 52 to a lower end portion of the second side wall portion 24B so as to be capable of swinging. Specifically, a head portion of the first link pin LP1 is disposed at a vehicle width direction inner side of the one end portion 52A. In plan view, the first link pin LP1 is disposed overlapping with the first bead 24D and the fixing bolt B2 fixing the front end portion of the fixing wall 24-1 on progression along the vehicle width direction. Namely, in plan view, the fixing bolt B2, the first bead 24D, and the first link pin LP1 are disposed in a row along the vehicle width direction.

A portion on the other end side of the first link 52 is formed with a first bent portion 52C that is bent substantially into a crank shape toward a vehicle width direction inner side. In the first link 52, the one end portion 52A is accordingly disposed offset to a vehicle width direction outer side with respect to another end portion 52B. The offset amount is set such that the head portion of the first link pin LP1 does not project out further to a vehicle width direction inner side than a vehicle width direction inner side face of the other end portion 52B.

The second link 54 is manufactured from sheet steel and formed substantially in an elongated plate shape, similarly to the first link 52. The second link 54 configures a portion on the other end side (a portion on an upper side) of the link mechanism 50, and is disposed at a vehicle width direction inner side of the first link 52 with a plate thickness direction in the vehicle width direction. As viewed from the side, in the stowed state of the link mechanism 50, the second link 54 is disposed in a state inclined toward the lower side on progression toward the front side (see FIG. 2).

A portion on one end side of the second link 54 configures a main body portion 54A (corresponding to "one end portion of the second link" according to technology disclosed herein). The main body portion 54A is disposed adjacent on a vehicle width direction inner side with respect to the other end portion 52B of the first link 52. As illustrated in the partial enlargement in FIG. 2, a circular coupling hole 54D for coupling the first link 52 described above is formed penetrating the main body portion 54A. Moreover, a slot 54E configuring the displacement mechanism 58 is formed penetrating the main body portion 54A on the one end side of the second link 54 with respect to the coupling hole 54D. The slot 54E extends along the length direction of the second link 54, and one end of the slot 54E is in communication with the coupling hole 54D. In other words, the slot 54E extends out from the coupling hole 54D toward the one end side of the second link 54. A width dimension of the slot 54E is set slightly smaller than a diameter dimension of the coupling hole 54D, and is set so as to be uniform along the length direction of the slot 54E.

A coupling pin 56 with an axial direction in the vehicle width direction, configuring the displacement mechanism 58, rotatably couples the other end portion 52B of the first link 52 described above to the main body portion 54A of the second link 54. Specifically, the coupling pin 56 is fixed to the other end portion 52B of the first link 52, and a shaft portion 56A of the coupling pin 56 projects out from the other end portion 52B toward the vehicle width direction inner side, and is inserted through the coupling hole 54D. Moreover, as illustrated in FIG. 1, a head portion of the coupling pin 56 is disposed adjacent at a vehicle width direction inner side to the main body portion 54A, and is disposed at a specific gap toward a vehicle width direction outer side with respect to the first arm 26. Moreover, the shaft portion 56A of the coupling pin 56 is formed with a substantially circular cross-section profile, and a diameter dimension of the shaft portion 56A is set slightly smaller than the diameter dimension of the coupling hole 54D, and set slightly larger than the width dimension of the slot 54E. The coupling pin 56 is thereby swingably supported in the coupling hole 54D, and the main body portion 54A of the second link 54 is rotatably coupled to the other end portion 52B of the first link 52.

A portion on the other end side of the second link 54 is formed with a second bent portion 54C (see FIG. 1) that is bent substantially into a crank shape toward a vehicle width direction inner side. The other end portion 54B of the second link 54 is accordingly disposed offset to a vehicle width direction inner side with respect to the main body portion 54A of the second link 54.

The other end portion 54B of the second link 54 is disposed adjacent on the front side with respect to the second coupling bolt B4 of the second arm 28. A second link pin LP2 with an axial direction in the vehicle width direction couples the other end portion 54B to the side wall 28-1 of the second arm 28, so as to be capable of swinging. In the above manner, in the link mechanism 50, the one end portion 52A of the first link 52 and the other end portion 54B of the second link 54 are offset with respect to each other in the vehicle width direction. The offset amount of the other end portion 54B of the second link 54 with respect to the one end portion 52A of the first link 52 in the vehicle width direction is set to the minimum possible amount in consideration of, for example, the plate thickness of the first link 52 and the second link 54, the dimensions of head portions of the first link pin LP 1 and the coupling pin 56, and the clearance (gaps) between the respective members. Namely, in the hinge base 24, an amount by which the second side wall portion 24B juts out toward the vehicle width direction inner side with respect to the first side wall portion 24A is set according to the minimum dimension of the link mechanism 50 in the vehicle width direction.

Setting is made such that when the actuator 30 is actuated and the hood 10 is lifted to the lifted position, the first link 52 swings relative to the hinge base 24 (see the arrow E in FIG. 4), and the second link 54 swings relative to the second arm 28 (see the arrow F in FIG. 4), and the link mechanism 50 extends in a straight line shape substantially along the up-down direction (the state illustrated in FIG. 5; this state is referred to below as an "actuated state").

In the actuated state of the link mechanism 50, when the specific load toward the upper side is input to the other end portion of the link mechanism 50 (the other end portion 54B of the second link 54) due to oscillation arising in the hood 10 that has been lifted to the lifted position, the swingably supported state of the coupling pin 56 in the coupling hole 54D is released, and the displacement mechanism 58 actuates. Specifically, configuration is made such that the slot 54E is enlarged by the coupling pin 56, and the slot 54E moves toward the upper side relative to the coupling pin 56. Namely, during actuation of the displacement mechanism 58, inner peripheral faces of the slot 54E are displaced toward the upper side while sliding against an outer peripheral face of the coupling pin 56, and the coupling pin 56 is disposed at the other end portion of the slot 54E. Here, configuration is thereby made such that the hood 10 is capable of moving further toward the upper side than the lifted position.

Explanation follows regarding operation and advantageous effects of the present exemplary embodiment.

In the PUH device 20 configured as described above, the rear end portion 26-1 of the first arm 26 is coupled to the hinge base 24 so as to be capable of swinging, and the front portion 26-3 of the first arm 26 is disposed offset to the vehicle width direction inner side with respect to the rear end portion 26-1 of the first arm 26. Moreover, the second arm 28 is disposed at the vehicle width direction inner side of the first arm 26, and is coupled to the first arm 26 so as to be capable of swinging. The second arm 28 is coupled to the hinge base 24 through the link mechanism 50, and the other end portion 54B of the second link 54 is disposed offset to the vehicle width direction inner side of the one end portion 52A of the first link 52.

In a frontal collision between the vehicle and a collision body such as a pedestrian, the ECU 40 determines whether or not the PUH devices 20 should be actuated based on a collision signal output to the ECU 40 from a collision detection sensor, not illustrated in the drawings. When the ECU 40 determines that the PUH devices 20 should be actuated, an actuation signal is output from the ECU 40 to the actuators 30, and the respective actuators 30 actuate.

When the respective actuators 30 actuate, the cylinder 32 rises with respect to the rod 36 due to the gas generated by the MGG. The cylinder 32 thereby lifts the rear end portion 28R of the second arm 28, and the rear end section of the hood 10 is lifted to the lifted position. Note that when this is performed, the shear pin joining the second arm 28 and the first arm 26 together snaps, the second arm 28 swings toward the upper side relative to the first arm 26, and the first arm 26 swings toward the upper side relative to the hinge base 24. Moreover, when this is performed, the link mechanism 50 actuates and switches from the stowed state to the actuated state, restricting movement of the second arm 28 toward the upper side with respect to the hinge base 24.

Note that during actuation of the link mechanism 50, the other end portion 54B of the second link 54 is pulled toward the upper side by the second arm 28, and the other end portion 52B of the first link 52 is pulled toward the upper side by the second link 54. Accordingly, load toward the other end side acts along the length direction in the first link 52 and the second link 54 respectively. If there were a large vehicle width direction offset amount between the one end portion 52A of the first link 52 and the other end portion 54B of the second link 54, there would be a possibility of the first link 52 wrenching out the first link pin LP1 while swinging during actuation of the link mechanism 50. Similarly, there would be a possibility of the second link 54 wrenching out the second link pin LP2 and the coupling pin 56 while swinging. In such cases, sliding resistance (swinging resistance) of the first link 52 with respect to the first link pin LP1, and sliding resistance (swinging resistance) of the second link 54 with respect to the second link pin LP2 and the coupling pin 56 would become large, and could cause operation loss in the link mechanism 50.

Note that the second side wall portion 24B, this being the location where the hinge base 24 is coupled to the link mechanism 50, is disposed further to the vehicle width direction inner side than the first side wall portion 24A, this being the location where the hinge base 24 is coupled to the first arm 26. Moreover, in the hinge base 24, the amount by which the second side wall portion 24B juts out toward the vehicle width direction inner side with respect to the first side wall portion 24A is set such that the link mechanism 50 has the minimum dimension in the vehicle width direction. Accordingly, the vehicle width direction offset amount between the one end portion 52A of the first link 52 and the other end portion 54B of the second link 54 can be suppressed from becoming large, even if the second arm 28 has a large offset amount toward the vehicle width direction inner side with respect to the hinge base 24. Sliding resistance of the first link 52 with respect to the first link pin LP1, and sliding resistance of the second link 54 with respect to the second link pin LP2 and the coupling pin 56 is thereby suppressed from becoming large during actuation of the link mechanism 50, thereby enabling operation loss of the link mechanism 50 to be suppressed. This thereby enables a drop in operation efficiency of the link mechanism 50 to be suppressed.

The side wall 24-2 of the hinge base 24 includes the first side wall portion 24A to which the first arm 26 is coupled, and the second side wall portion 24B to which the first link 52 is coupled. The second side wall portion 24B is integrally formed with the first side wall portion 24A, and juts out toward the vehicle width direction inner side with respect to the first side wall portion 24A. The fixing wall 24-1 of the hinge base 24 extends out toward the vehicle width direction outer side from the lower end portion of the first side wall portion 24A and the second side wall portion 24B. This thereby enables the vehicle width direction offset amount of the one end portion 52A of the first link 52 and the other end portion 54B of the second link 54 to be suppressed from becoming large, while configuring the side wall 24-2 (the first side wall portion 24A and the second side wall portion 24B) with high strength.

In plan view, the fixing bolt B2 that fixes the front end portion of the fixing wall 24-1 of the hinge base 24 to the vehicle body is disposed overlapping with the first link pin LP1 coupled to the second side wall portion 24B in the vehicle width direction. The second side wall portion 24B and the fixing position of the fixing wall 24-1 can accordingly be made to match in the front-rear direction. This thereby enables the support performance of the first link 52 by the hinge base 24 to be raised.

The fixing wall 24-1 of the hinge base 24 is formed with the first bead 24D, and the fixing wall 24-1 extends along the vehicle width direction at a position on the vehicle width direction inner side of the fixing bolts B2. Accordingly, even if a front end portion of the fixing wall 24-1 were to be extended toward the vehicle width direction inner side such that the second side wall portion 24B jutted out toward the vehicle width direction inner side with respect to the first side wall portion 24A, the rigidity of the extended portions of the fixing wall 24-1 could be raised. This thereby enables the support performance of the first link 52 by the hinge base 24 to be further raised.

The link mechanism 50 includes the displacement mechanism 58. The displacement mechanism 58 actuates when the specific load toward the upper side is input to the other end portion of the link mechanism 50 (the other end portion 54B of the second link 54) due to oscillation arising in the hood 10 that has been lifted to the lifted position. This thereby enables damping of oscillation arising in the hood 10 at an early stage. Explanation follows regarding this point, with reference to FIG. 6A to FIG. 6D. FIG. 6A to FIG. 6D schematically illustrate states of the hood 10 in time sequence when the actuator 30 lifts the hood 10, as viewed from the rear side. The two vehicle width direction end portions of the hood 10 are indicated by hollow circles.

Figure 6A:
FIG. 6A is an explanatory diagram to explain behavior of a hood when a vehicle pop-up hood device of the present exemplary embodiment is actuated, and is an explanatory diagram illustrating an example of a state prior to actuators lifting the hood.
Figure 6B:
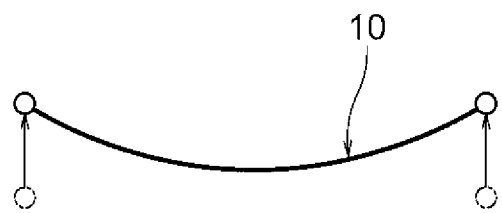
FIG. 6B is an explanatory diagram to explain behavior of a hood when a vehicle pop-up hood device of the present exemplary embodiment is actuated, and is an explanatory diagram illustrating an example of a state in which only the two vehicle width direction end portions of a hood have been lifted in an initial lifting stage of the hood.
Figure 6C:
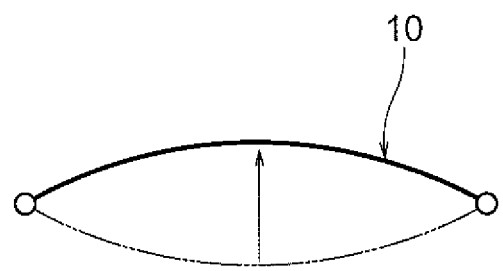
FIG. 6C is an explanatory diagram to explain behavior of a hood when a vehicle pop-up hood device of the present exemplary embodiment is actuated, and is an explanatory diagram illustrating an example of a state in which a vehicle width direction central portion of the hood that has been displaced toward the upper side has been displaced further to the upper side than a lifted position due to inertia.
Figure 6D:
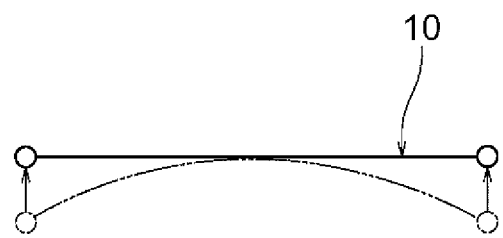
FIG. 6D is an explanatory diagram to explain behavior of a hood when a vehicle pop-up hood device of the present exemplary embodiment is actuated, and is an explanatory diagram illustrating an example of a state in which the two vehicle width direction end portions of the hood have been displaced further toward the upper side than a lifted position.

FIG. 6A illustrates a state prior to the actuator 30 lifting the hood 10. In this state, the link mechanism 50 is in the stowed state (see FIG. 4). When the actuator 30 actuates and the hood 10 is lifted to the lifted position, the link mechanism 50 switches from the stowed state to the actuated state (see FIG. 5). In the actuated state, the slot 54E of the displacement mechanism 58 is disposed so as to extend from the coupling hole 54D toward the lower side. Note that in the link mechanism 50, the diameter dimension of the shaft portion 56A of the coupling pin 56 that couples the first link 52 and the second link 54 together is set larger than the width dimension of the slot 54E, such that in the actuated state, the coupling pin 56 is retained in the coupling hole 54D. Namely, displacement of the second arm 28 toward the upper side with respect to the hinge base 24 is restricted by the link mechanism 50, and displacement of both vehicle width direction end portions of the rear end section of the hood 10 toward the upper side is restricted.

When the two vehicle width direction end portions of the rear end section of the hood 10 are lifted, a vehicle width direction central portion of the hood 10 attempts to remain at its initial position due to inertia. Accordingly, during initial lifting of the hood 10 by the actuators 30, only the two vehicle width direction end portions of the hood 10 are lifted (see the state in FIG. 6B). The vehicle width direction central portion of the hood 10 is then displaced toward the upper side later than the two vehicle width direction end portions of the hood 10 (see the arrow illustrated in FIG. 6C). Since displacement of the vehicle width direction central portion of the hood 10 in the up-down direction is not restricted, the vehicle width direction central portion of the hood 10 undergoing displacement toward the upper side is displaced (overshoots) further toward the upper side than the lifted position due to inertia (see the state in FIG. 6C). Accordingly, as viewed from the rear side, during lifting of the hood 10, the hood 10 attempts to exhibit simple harmonic motion, with an antinode at the vehicle width direction central portion of the hood 10, and with nodes at the two vehicle width direction end portions of the hood 10.

When the vehicle width direction central portion of the hood 10 overshoots further to the upper side than the lifted position, the specific load toward the upper side from the hood 10 acts on the other end portion (the other end portion 54B of the second link 54) of the link mechanism 50 through the second arm 28. The displacement mechanism 58 of the link mechanism 50 is thereby actuated. Specifically, the swingably supported state of the coupling pin 56 by the coupling hole 54D is released, and the second link 54 is displaced toward the upper side (the arrow G direction side illustrated in FIG. 5) while the outer peripheral face of the coupling pin 56 slides against the inner peripheral face of the slot 54E. The second arm 28 accordingly swings toward the upper side with respect to the first arm 26 and moves toward the upper side with respect to the hinge base 24, and the other end portion of the link mechanism 50 is displaced toward the vehicle upper side together with the two vehicle width direction end portions of the hood 10. Specifically, when the vehicle width direction central portion of the hood 10 reaches the upper dead center or the vicinity of the upper dead center, the two vehicle width direction end portions of the hood 10 are displaced further toward the upper side than the lifted position (adopt the state in FIG. 6D from the state in FIG. 6C). As a result, as viewed from the rear side, the two vehicle width direction end portions of the hood 10 are released, such that the hood 10 becomes substantially horizontal. This thereby enables oscillation arising in the hood 10 due to overshooting to be damped at an early stage.

Next, explanation follows regarding variations on the configuration of the link mechanism 50.

Variation 1

Figure 7:
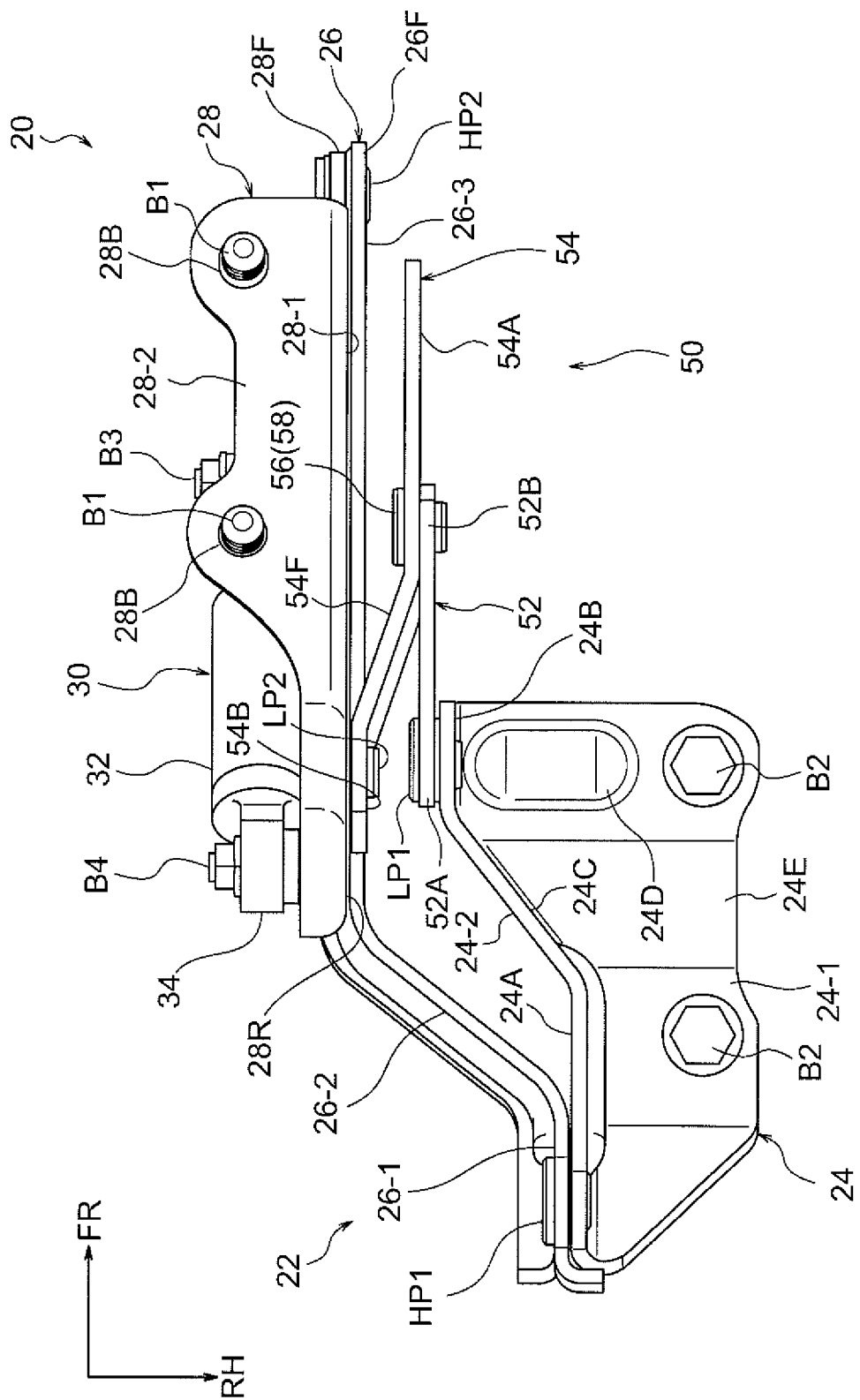
FIG. 7 is a plan view illustrating a Variation of a link mechanism illustrated in FIG. 1.

As illustrated in FIG. 7, in Variation 1 of the link mechanism 50, the first bent portion 52C is omitted from the first link 52, and the first link 52 extends substantially in a straight line shape along the front-rear direction. Namely, the positions of the one end portion 52A and the other end portion 52B match each other in the vehicle width direction. Moreover, the second bent portion 54C is omitted from the second link 54, and an inclined portion 54F is formed at a length direction intermediate portion of the second link 54. The inclined portion 54F is disposed so as to be inclined toward the vehicle width direction inner side on progression from one length direction side toward the other length direction side of the second link 54. Moreover, although not illustrated in the drawings, the inclined portion 54F is disposed overlapping the cutaway portion 26C of the first arm 26 as viewed from the side. Namely, the inclined portion 54F is disposed so as to straddle the cutaway portion 26C of the first arm 26 as viewed from the side.

As described above, in the link mechanism 50 of Variation 1, the first link 52 extends substantially in a straight line shape along the front-rear direction. The vehicle width direction positions of the one end portion 52A and the other end portion 52B of the first link 52 can accordingly be made to match each other. This thereby enables good swinging of the first link 52 during actuation of the link mechanism 50.

Variation 2

Figure 8:
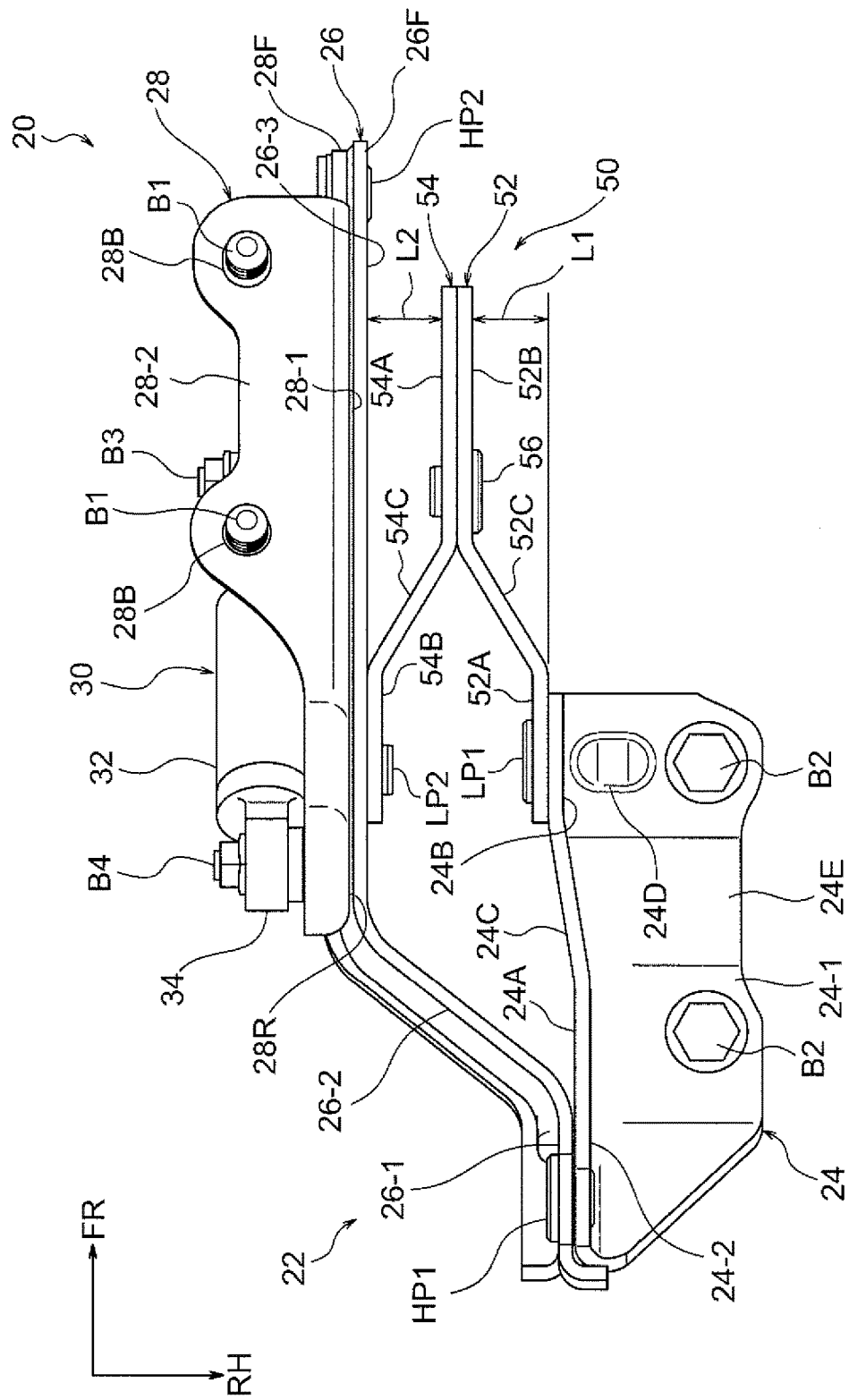
FIG. 8 is a plan view illustrating another Variation of a link mechanism illustrated in FIG. 1.

As illustrated in FIG. 8, in Variation 2 of the link mechanism 50, the vehicle width direction dimension of the link mechanism 50 is not the minimum dimension, and the link mechanism 50 is set with a larger vehicle width direction dimension than the link mechanism 50 of the present exemplary embodiment. Moreover, in Variation 2, in the vehicle width direction, a distance L1 from the one end portion 52A to the other end portion 52B of the first link 52 is set so as to match a distance L2 from the main body portion 54A to the other end portion 54B of the second link 54. Variation 2 thereby enables a coupling location between the first link 52 and the second link 54 (the coupling pin 56) to be disposed at a vehicle width direction central portion of the link mechanism 50. This thereby enables well-balanced placement of the first link 52 and the second link 54.

From the perspective of damping the oscillation of the hood 10 that has been lifted to the lifted position at an early stage, the link mechanism 50 is preferably provided with the displacement mechanism 58, as in the present exemplary embodiment. However, depending on the type of vehicle, for example in configurations in which the bending rigidity of the hood 10 is comparatively high, the overshoot of the hood 10 when the two vehicle width direction end portions of the hood 10 are lifted by the actuators 30 is comparatively small. In vehicles with such a hood 10, the displacement mechanism 58 may therefore be omitted from the link mechanism 50. Namely, the slot 54E of the first link 52 may be omitted.

All cited documents, patent applications, and technical standards mentioned in the present specification are incorporated by reference in the present specification to the same extent as if the individual cited document, patent application, or technical standard was specifically and individually indicated to be incorporated by reference.

What is claimed is:

1. A vehicle pop-up hood device, comprising:
   a hinge base that is fixed to a vehicle body;
   a first arm that is disposed at a vehicle width direction inner side of the hinge base, that has a rear end portion coupled to the hinge base so as to be capable of swinging, and that has a front portion disposed offset toward a vehicle width direction inner side with respect to the rear end portion;
   a second arm that is disposed at a vehicle width direction inner side of the first arm, that is fixed to a vehicle width direction outer side end portion of a rear section of a hood, that is coupled to the front portion of the first arm so as to be capable of swinging, and that moves the hood toward a vehicle upper side by swinging with respect to the first arm;
   an actuator that spans between the first arm and the second arm, actuation of the actuator causing the second arm to be swung with respect to the first arm, whereby the hood is lifted from a closed position to a lifted position; and
   a link mechanism that includes a first link having one end portion coupled to the hinge base so as to be capable of swinging, and a second link having one end portion coupled to another end portion of the first link so as to be capable of swinging and having another end portion coupled to the second arm so as to be capable of swinging, the link mechanism adopting a stowed state in a non-actuated state of the actuator, and adopting an actuated state limiting movement of the second arm toward the vehicle upper side with respect to the hinge base at a time of completion of actuation of the actuator,
   wherein a coupling location of the hinge base to the first link is disposed further toward the vehicle width direction inner side than a coupling location of the hinge base to the first arm.

2. The vehicle pop-up hood device of claim 1, wherein:
   the first link extends in a straight line shape along a vehicle front-rear direction in plan view; and
   a length direction intermediate portion of the second link is formed with an inclined portion that is inclined toward the vehicle width direction inner side on progression from one end side of the second link toward another end side of the second link.

3. The vehicle pop-up hood device of claim 1, wherein a distance from the one end portion of the first link to the other end portion of the first link in the vehicle width direction matches a distance from the one end portion of the second link to the other end portion of the second link in the vehicle width direction.

4. The vehicle pop-up hood device of claim 1, wherein the hinge base includes:
   a side wall including a first side wall portion and a second side wall portion, wherein the first arm is coupled to the first side wall portion, the second side wall portion is integrally formed with the first side wall portion and is disposed at a vehicle width direction inner side of the first side wall portion, and the first link is coupled to the second side wall portion; and
   a fixing wall that extends out from a lower end portion of the first side wall portion and the second side wall portion toward a vehicle width direction outer side, and that is fixed to the vehicle body.

5. The vehicle pop-up hood device of claim 4, wherein:
   the fixing wall is fixed to the vehicle body by a fixing member; and
   in plan view, the fixing member is disposed overlapping with a coupling location of the hinge base to the first link in the vehicle width direction.

6. The vehicle pop-up hood device of claim 5, wherein the fixing wall is formed with a bead that extends along the vehicle width direction at a position at a vehicle width direction inner side of the fixing member.

* * * * *